(12) United States Patent
Yuk et al.

(10) Patent No.: US 9,155,070 B2
(45) Date of Patent: Oct. 6, 2015

(54) METHOD AND APPARATUS FOR TRANSMITTING UPLINK DATA BURST IN WIRELESS CONNECTION SYSTEM

(75) Inventors: Youngsoo Yuk, Anyang-si (KR); Aeran Youn, Anyang-si (KR); Kiseon Ryu, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 359 days.

(21) Appl. No.: 13/521,035

(22) PCT Filed: Jan. 27, 2011

(86) PCT No.: PCT/KR2011/000589
§ 371 (c)(1),
(2), (4) Date: Oct. 18, 2012

(87) PCT Pub. No.: WO2011/093663
PCT Pub. Date: Aug. 4, 2011

(65) Prior Publication Data
US 2013/0114494 A1   May 9, 2013

Related U.S. Application Data

(60) Provisional application No. 61/298,887, filed on Jan. 27, 2010.

(30) Foreign Application Priority Data

Jan. 27, 2011   (KR) .................... 10-2011-0008259

(51) Int. Cl.
*H04W 72/04* (2009.01)
*H04W 74/00* (2009.01)
*H04W 74/08* (2009.01)

(52) U.S. Cl.
CPC ............ *H04W 72/04* (2013.01); *H04W 74/006* (2013.01); *H04W 74/0866* (2013.01)

(58) Field of Classification Search
CPC ...... H04W 84/18; H04W 84/12; H04L 47/10; H04L 47/30
USPC .......................................... 370/312, 310, 229
See application file for complete search history.

(56) References Cited

U.S. PATENT DOCUMENTS

| | | | |
|---|---|---|---|
| 2005/0053288 A1* | 3/2005 | Srinivasan et al. | 382/233 |
| 2007/0109995 A1* | 5/2007 | Quigley et al. | 370/329 |
| 2008/0187136 A1* | 8/2008 | Zhang et al. | 380/270 |
| 2009/0086673 A1* | 4/2009 | Aminaka et al. | 370/329 |
| 2010/0128689 A1* | 5/2010 | Yoon et al. | 370/329 |
| 2011/0002279 A1* | 1/2011 | Yang et al. | 370/329 |

FOREIGN PATENT DOCUMENTS

| | | |
|---|---|---|
| KR | 10-2005-0053312 | 6/2005 |
| KR | 10-2005-0078635 | 8/2005 |
| KR | 10-2007-0016208 | 2/2007 |

\* cited by examiner

*Primary Examiner* — Andrew Lai
*Assistant Examiner* — Zhiren Qin
(74) *Attorney, Agent, or Firm* — Lee, Hong, Degerman, Kang & Waimey

(57) ABSTRACT

In this specification, a method for transmitting an uplink data burst of a terminal in a wireless connection system comprises: a step of receiving a first message from a base station, which includes resource allocation information for competition-based uplink data burst transmission and control information for determining the number of terminals which attempt competition-based uplink data burst transmission; and a step of transmitting an uplink data burst to the base station over a resource domain allocated through the resource allocation information on the basis of the control information.

16 Claims, 4 Drawing Sheets

METHOD AND APPARATUS FOR TRANSMITTING UPLINK DATA BURST IN WIRELESS CONNECTION SYSTEM

CROSS-REFERENCE TO RELATED APPLICATIONS

This application is the National Stage filing under 35 U.S.C. 371 of International Application No. PCT/KR2011/000589, Jan. 27, 2011, which claims the benefit of earlier filing date and right of priority to Korean Application No. 10-2011-0008259, filed on Jan. 27, 2011, and also claims the benefit of U.S. Provisional Application Ser. No. 61/298,887, filed Jan. 27, 2010, the contents of which are all incorporated by reference herein in their entirety.

TECHNICAL FIELD

The present disclosure relates to a wireless access system, and more particularly, to a method and device for transmitting a contention-based uplink data burst.

BACKGROUND ART

Mobile station can transmit uplink data to a base station through a method of using a random access process and a scheduled access process.

In general, when the number of users within a cell is small, the random access process is more effective than the scheduled access process in the aspect or latency and throughput.

When the number of users increases within a cell, the probability of contention in random access increases, thereby abruptly decreasing the efficiency of uplink transmission.

However, if the number of users increases when the coverage is wide such as a cellular network, then centralized control through scheduling is effective.

Though a small-sized cell such as femto-cell is based on cellular technology, random access is effective since the number of users within a cell is small.

Hereinafter, a typical random access process will be described in brief with reference to the accompanying drawings.

FIG. 1 is a view illustrating an uplink resource allocation procedure of a mobile station using a contention-based request scheme.

Referring to FIG. 1, a mobile station transmits a CDMA code randomly selected for a slot that is randomly selected from an area allocated to the bandwidth request in uplink (S110).

If the base station recognizes the CDMA code sent from the mobile station, then the base station allocates resources to which a bandwidth request message is transmitted using a CDMA allocation information element (CDMA_Allocation_IE) (S120).

The mobile station that has received information on uplink resources for transmitting a bandwidth request message transmits the bandwidth request message to the relevant resource area. At this time, the mobile station may use a bandwidth request (BR) header, and the header may include information on a size of the requested bandwidth and the like (S130).

If the bandwidth requested by the mobile station is available, then the base station allocates uplink resources to the mobile terminal (S140).

The mobile station transmits data to the allocated uplink resources (S150).

FIG. 2 is a view illustrating an example of a 3-step random access based bandwidth request process.

The mobile station in a broadband wireless access system may use a 3-step or 5-step random access scheme. The 5-step random access scheme may be used independently from the 3-step random access scheme, and used also as a fall-back mode when the 3-step scheme is failed.

An advanced mobile station (AMS) transmits a bandwidth request preamble sequence and quick access message to a serving advanced base station (S-ABS) in a randomly selected opportunity (S210).

At this time, the quick access message may include a station identifier (ID), which is uplink bandwidth request information, a BR index indicating a bandwidth request size and QoS, and the like.

The base station may transmit a BR ACK A-MAP (advanced MAP) information element to mobile stations in the form of broadcast/multicast (S220).

Furthermore, the base station that has normally received the BR preamble sequence and quick access message allocates uplink resources to each mobile station, and transmits uplink resource allocation information to each mobile station through a UL basic assignment A-MAP information element (UL basic assignment A-MAP IE) (S230). The mobile station may transmit uplink data to the base station through the allocated uplink transmission area. At this time, the mobile station may transmit an additional uplink bandwidth request to the base station at the same time (S240).

FIG. 3 is a view illustrating an example of a 5-step random access based bandwidth request process as a contingency plan for the failure of 3-step.

The mobile station transmits a BR preamble sequence (or BR code), uplink bandwidth request information (station ID), a BR index indicating a request size and QoS, and the like, using a quick access message (S310).

The base station can transmit the receiving status of a BR preamble sequence and quick access message transmitted by each of the mobile stations through a BR ACK A-MAP information element to the mobile stations. However, it is assumed that the BR preamble sequence is normally decoded but the quick access message is failed. Accordingly, the BR ACK A-MAP information element indicates that the BR preamble sequence has been normally received and the quick access message has an error (S320).

The base station that has normally received only the BR preamble sequence transmitted from the mobile station allocates uplink resources for allowing the mobile station to transmit a bandwidth request (BW-REQ) message to the mobile station through a CDMA allocation A-MAP information element (CDMA Allocation A-MAP IE) (S330).

In the step S330, the CDMA A-MAP information element may be transmitted in the grant form for independent BR.

The mobile terminal transmits a BW-REQ message (e.g. independent BR header format) through the allocated area (S340).

The base station that has received the BW-REQ message transmitted by the mobile station allocates uplink resources to the mobile station using an uplink basic assignment A-MAP information element (UL basic assignment A-MAP IE) or a grant message for uplink data transmission (S350).

The mobile station transmits UL data through the located uplink resource area to the base station. At this time, the mobile station can transmit an additional uplink bandwidth request information element at the same time to the base station (S360).

FIG. 3 illustrates a 5-step random access scheme as a contingency plan for the failure of the 3-step random access scheme in FIG. 2. However, a typical 5-step scheme is distinguished from FIG. 3 only in that the mobile station does not send a quick access message in the step S310, and the remaining processes may be used and carried out as they are described in FIG. 3.

As described above, according to a typical random access process, uplink resources are allocated by a request of the mobile station, and uplink data burst transmission should be carried out through the allocated resource area, thereby causing a problem that time is delayed until the uplink data burst transmission.

DISCLOSURE OF THE INVENTION

According to the present disclosure, there is provided a method for allowing a mobile station to use UL resources that are unused by the base station in uplink data burst transmission through contention-based random access.

Furthermore, there is provided a method for transmitting and receiving data without using a bandwidth request or the like in an environment where the number of users is small.

According to the present disclosure, there is provided a method of transmitting an uplink data burst of a mobile station in a wireless access system, and the method may include receiving a first message containing resource allocation information for contention-based uplink data burst transmission and control information for determining the number of mobile stations attempting contention-based uplink data burst transmission from a base station; and transmitting an uplink data burst to the base station through a resource area allocated from the resource allocation information based on the control information.

Furthermore, the method may be characterized in that the control information is modulation and coding scheme (MCS) bound information having a channel quality indicator (CQI) feedback level value reported by the mobile station.

Furthermore, the method may be characterized in that the control information is minimum access class information.

Furthermore, the method may be characterized in that the uplink data burst is transmitted to the base station when the latest CQI feedback value of the mobile station or the access class of the mobile station has a value greater than or equal to that of the control information.

Furthermore, the method may be characterized in that the first message is a random access map (Random Access A-MAP) message.

Furthermore, the method may be characterized in that the first message is CRC-masked with a broadcast STID or multicast STID to be transmitted.

Furthermore, the method may be characterized in that the resource allocation information includes any one of a resource allocation location, a resource allocation area size and MCS information, and the first message includes at least any one of maximum retransmission number information and HARQ ACK channel information.

Furthermore, the method may further include comparing the resource allocation area size with a size of the uplink data burst to be transmitted to the base station; and transmitting a message for bandwidth request to the base station when the size of the uplink data burst to be transmitted is greater than the resource allocation area size as a result of the comparison.

Furthermore, the method may further include receiving an uplink basic assignment map message from the base station; and transmitting the remaining uplink data burst to the base station through a resource area allocated by the uplink basic assignment map message.

Furthermore, the method may be characterized in that the message for bandwidth request is a bandwidth request extension header, and the bandwidth request extension header is piggybacked with an uplink data burst to be transmitted.

Furthermore, the method may be characterized in that the uplink data burst is transmitted to MAC PDU, and the MAC PDU includes a mobile station identifier for identifying a mobile station.

Furthermore, the method may further include receiving an indicator indicating whether the first message is transmitted from the base station; and determining whether to monitor the first message using the received indicator.

Furthermore, the method may be characterized in that the first message includes total number of streams (TNS) information indicating a total number of streams used in the uplink data burst transmission.

Furthermore, the method may be characterized in that any one of the total number of streams is selected to transmit an uplink data burst to the base station through the selected stream.

Furthermore, according to the present disclosure, there is provided a mobile station for transmitting an uplink data burst in a wireless access system, and the mobile station may include a memory; a radio frequency unit configured to transmit and/or receive a wireless signal to and/or from an external device; and a controller configured to control the radio frequency unit to receive a first message containing resource allocation information for contention-based uplink data burst transmission and control information for determining the number of mobile stations attempting contention-based uplink data burst transmission from a base station, and control the radio frequency unit to transmit an uplink data burst to the base station through a resource area allocated from the resource allocation information based on the control information.

Furthermore, the mobile station may be characterized in that the controller controls such that the uplink data burst is transmitted to the base station when the latest CQI feedback value of the mobile station or the access class of the mobile station has a value greater than or equal to that of the control information.

Furthermore, the mobile station may be characterized in that the controller controls the radio frequency unit to compare the resource allocation area size with a size of the uplink data burst to be transmitted to the base station, and transmit a message for bandwidth request to the base station when the size of the uplink data burst to be transmitted is greater than the resource allocation area size as a result of the comparison.

Furthermore, the mobile station may be characterized in that the controller controls the radio frequency unit to receive an uplink basic assignment map message from the base station, and controls the radio frequency unit to transmit the remaining uplink data burst to the base station through a resource area allocated by the uplink basic assignment map message.

Furthermore, the mobile station may be characterized in that the message for bandwidth request is a bandwidth request extension header, and the controller controls the main control unit such that the bandwidth request extension header is piggybacked with an uplink data burst to be transmitted.

According to the present disclosure, the base station may allocate unused UL resources to the mobile station, thereby having an effect of transmitting uplink data through the UL resources allocated from the base station without resource consumption and time delay due to a code based bandwidth request when the mobile station has uplink data to be transmitted.

Furthermore, even when the probability of contention in random access is low in a system having a small number of users such as a femto cell, data can be effectively transmitted compared to the scheduling scheme through a code based bandwidth request.

MODES FOR CARRYING OUT THE PREFERRED EMBODIMENTS

Figure 1:
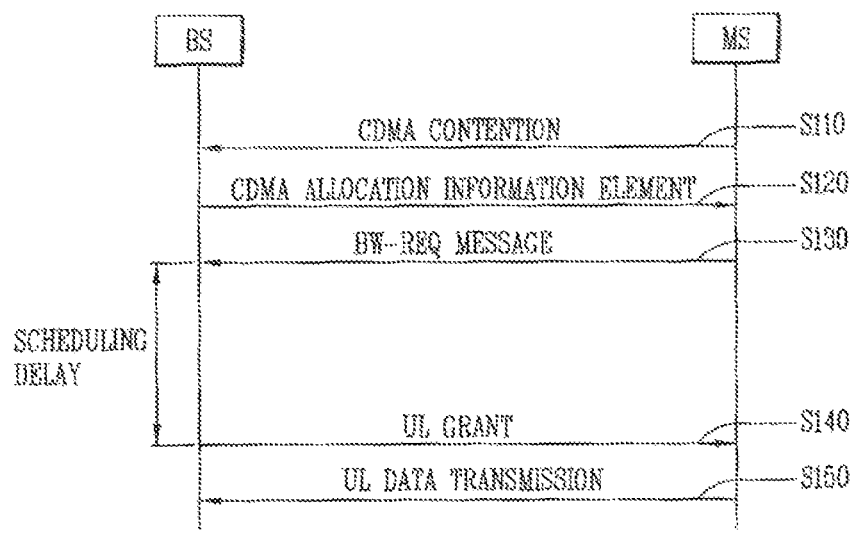
FIG. 1 is a view illustrating an uplink resource allocation procedure of a mobile station using a contention-based request scheme.
Figure 2:
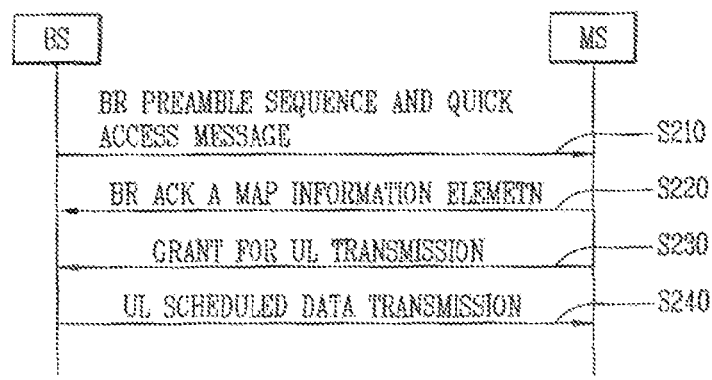
FIG. 2 is a view illustrating an example of a 3-step random access based bandwidth request process.
Figure 3:
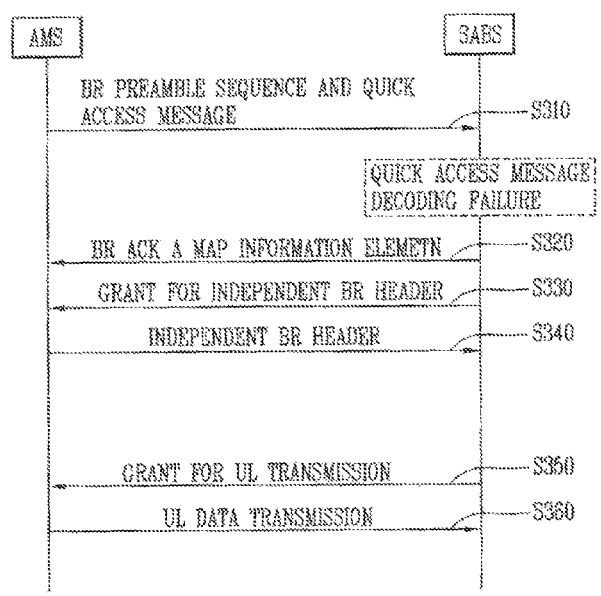
FIG. 3 is a view illustrating an example of a 5-step random access based bandwidth request process as a contingency plan for the failure of 3-step.

Hereinafter, embodiments according to the present disclosure will be described in detail with reference to the accompanying drawings. In the following description, it should be noted that only a portion required to understand the operation according to the present disclosure will be described, and the description of the remaining portion will be omitted not to obscure the gist of the present disclosure.

In the following embodiments, the constituent elements and features of the present disclosure are combined with one another in a predetermined form. Each constituent element or feature thereof should be considered to be selective as unless otherwise particularly specified. Each constituent element or feature thereof may be implemented in a form that is not combined with any other constituent elements or features. Furthermore, an embodiment of the present disclosure may be also configured by combining some of the constituent elements and/or features. The sequence of the operations described in the embodiments of the present disclosure may be changed. Some of the configurations or features of any embodiment may be included in any other embodiments, or may be replaced with the configurations and features corresponding to the any other embodiments.

Embodiments of the present disclosure are described mainly in relation to the transmission and reception of data between a base station and a mobile station. Here, the base station has also the meaning of a terminal node of a network, which directly performs communication with the terminal. In this disclosure, a specific operation described to be performed by a base station may be carried out by an upper node of the base station if necessary.

In other words, it should be understood that various operations carried out for the communication with a terminal in a network comprised of a plurality of network nodes including a base station can be carried out by the base station or other network nodes except the base station. The term "base station" may be replaced by a term such as fixed station, Node B, eNode B (eNB), access point, or the like. Furthermore, the term "terminal" may be replaced by a term such as UE (user equipment), MS (mobile station), MSS (mobile subscriber station), or the like.

Embodiments of the present disclosure may be implemented through various means. For example, embodiments of the present disclosure may be implemented by hardware, firmware, software, or any combination thereof.

In case of a hardware implementation, a method according to the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In case of a firmware or software implementation, a method according to the embodiments of the present disclosure may be implemented in the form of a module, procedure, function, or the like which performs the functions or operations as described above. The software codes may be stored in a memory unit to be driven by a processor. The memory unit may be located at an inner or outer portion of the processor to send or receive data to and/or from the processor by various publicly-known means.

Specific terms used herein are provided to help understanding of the present disclosure, and the use of those specific terms may be replaced with other terms without departing from the technical concept of the present disclosure.

First Embodiment

According to a first embodiment, there is provided a method of transmitting contention-based uplink data using Random Access A-MAP.

Resource Allocation Method for Contention-Based Random Access

The base station transmits a CRC-masked control message to the mobile station using a predetermined identifier (ID). Here, the control message may be Random Access A-MAP, PDCCH. Furthermore, the control message may be transmitted for each frame or transmitted for each sub-frame, and transmitted periodically or non-periodically at a predefined location or any location of the frame or sub-frame.

Hereinafter, a case of Random Access A-MAP (RA A-MAP), which is an example of the control message, will be described for example.

The control message may include a resource allocation location, modulation and coding scheme (MCS) information, a number of maximum retransmissions, HARQ ACK channel information, and the like.

The mobile station with the identifier (ID) allocated from the base station (namely, RA allowed mobile station) receives the Random Access A-MAP from the base station since the uplink data burst transmission is required. Here, the Random Access A-MAP may be broadcast by the base station or transmitted in a multicast manner.

The mobile station transmits an uplink data burst to the base station through a resource area allocated by the received Random Access A-MAP.

UL Random Access A-MAP (UL RA A-MAP)

The base station allocates available resources to the mobile station through UL RA A-MAP. In this case, the UL RA A-MAP transmitted to the mobile station can be received by all mobile station in a broadcast manner. In this case, the base station transmits UL RA A-MAP to the mobile station by masking a well-known STID with CRC.

Furthermore, the UL RA A-MAP transmitted to the mobile station may be received by a specific group of mobile stations in a multicast manner. In this case, the base station transmits the UL RA A-MAP to a specific group of mobile stations by masking a multicast STID with CRC.

A mobile station having uplink data to be transmitted to the base station among mobile stations that have received the UL RA A-MAP from the base station transmits a data burst to a resource area allocated by the received UL RA A-MAP.

Here, the area allocated by the UL RA A-MAP corresponds to an area in which contention occurs by a plurality of mobile stations that have received the UL RA A-MAP from the base station.

Accordingly, when a plurality of mobile station transmit an uplink data burst to the area, a reception error may occur at the base station.

In this case, when maximum retransmission by HARQ retransmission is supported, resource consumption may occur due to meaningless retransmission in case where contention occurs in the area.

Accordingly, information for limiting the maximum number of retransmissions may be contained in the UL RA A-MAP or the retransmission process may not be carried out for uplink data burst transmission by the UL RA A-MAP.

Contention Control Method

Furthermore, the number of mobile stations attempting uplink data burst transmission may be controlled to solve a case where a, reception error occurs due to the occurrence of contention as described above. For a method of controlling the number of mobile stations, there are a static method and a dynamic method, for example.

1. Static Control (Method of Controlling the Number of Mobile Stations Using STID)

In case of a static control, namely, a method of controlling the number of mobile station attempting uplink data transmission using STID, the base station allocates a well-known STID (RNTI in case of 3GPP) in advance, thereby allowing all the mobile stations to know the STID. In this case, the UL RA A-MAP is transmitted to all the mobile stations in a broadcast manner.

As another method, the base station allocates a multicast STID for each mobile station during a registration process with the mobile station, thereby allowing only a specific group of mobile stations to transmit an uplink data burst through a resource area allocated by the UL RA A-MAP.

As still another method, the base station may allocate a multicast STID for a specific flow identifier (FID) during service negotiations with the mobile station, thereby allowing only particular services of specific mobile stations to access the base station so as to control the number of mobile stations.

2. Dynamic User Control (Method of Controlling the Number of Mobile Stations Using UL RA A-MAP)

The base station may control the number of mobile stations by explicitly containing a condition of transmittable mobile stations in the UL RA A-MAP, thereby reducing the frequency of reception error due to the occurrence of contention.

The base station may transmit the UL RA A-MAP to the mobile station by containing distance (reception performance) information, access priority information or the like therein, thereby controlling the number of mobile stations.

Furthermore, the base station may transmit the UL RA A-MAP by containing an MCS bound therein. In this case, only mobile stations having an MCS bound greater than a predetermined value may attempt uplink data burst transmission through the allocated area based on a current CQI report transmitted to the base station.

For example, it is assumed that a CQI feedback value reported to the base station has a value between 1 and 15. In this case, assuming that an MCS bound contained in the UL RA A-MAP is 4, it should be a mobile station with a CQI feedback value reported to the base station equal to or greater than 4 in order to transmit an uplink data burst through an area allocated by the UL RA A-MAP.

Furthermore, the base station may transmit the UL RA A-MAP to the mobile station by containing minimum access class therein. In this case, only mobile stations with services for which the access class of a current mobile station is equal to or greater than the minimum contained in the UL RA A-MAP may attempt uplink data burst transmission.

Furthermore, the base station may inform the mobile station of whether to support UL RA transmission through a message such as AAI_SCD, AAI_SBC, REG-RSP, and the like.

In this case, the mobile station may check information indicating whether or not the base station supports UL RA transmission, thereby determining whether to monitor UL RA A-MAP transmitted from the base station.

The following Table 1 illustrates an example of the format of UL Random Access A-MAP (UL RA A-MAP) in case of using only one stream according to an embodiment of the present disclosure.

TABLE 1

| Syntax | Size in bits | Description/Notes |
| --- | --- | --- |
| UL Random Access A-MAP IE( ){ | — | — |
| A-MAP IE Type | 4 | UL random access A-MAP IE |
| I$_{sizeoffset}$ | 5 | Offset used to compute burst size index |
| Resource Index | 11 | 5 MHz: 0 in first 2 MSB bits + 9 bits for resource index<br>10 MHz: 11 bits for resource index<br>20 MHz: 11 bits for resource index<br>Resource index includes location and allocation size |
| Long TTI Indicator | 1 | Indicates number of subframes spanned by the allocated resource.<br>0b0: 1 subframe (default)<br>0b1: 4 UL subframes for FDD or all UL subframes for TDD<br>If number of DL subframes, D is less than number of UL subframes, U, Long TTI Indicator = 0b1 |
| HFA | 6 | HARQ Feedback Allocation |
| Number of Retransmission | 2 | Maximum number of retransmissions if decoding is failed.<br>0b00: 0, 0b01: 1, 0b10: 2, 0b11: 3 |
| MCS Bound(Lower) | 4 | The MCS bound for this transmission. AMSs whose latest nominal MCS reported is equal or larger than MCS Bound is allowed to transmit the data burst through this allocation. |

TABLE 1-continued

| Syntax | Size in bits | Description/Notes |
|---|---|---|
| MCS Bound(Upper) | 4 | The MCS bound for this transmission. AMSs whose latest nominal MCS reported is equal or lesser than MCS Bound is allowed to transmit the data burst through this allocation. |
| Minimum Access Class | 2 | PDU whose access class is equal or larger than minimum access class is allowed to be sent in this allocation. |
| Reserved | 5 | |

Referring to the above Table 1, the RA A-MAP contains a number of retransmissions field, an MCS bound field, and a minimum access class field.

Here, the number of retransmissions field is a field indicating the maximum number of retransmissions that can be carried out by the mobile station when the uplink data burst transmission of the mobile station is failed. It is provided to reduce unnecessary retransmissions.

Furthermore, the MCS bound field indicates an MCS reference value of the mobile station capable of transmitting contention UL. It indicates that only mobile stations for which the latest MCS value reported through CQI is greater than or equal to the MCS bound can transmit an uplink data burst through a resource area allocated through the RA A-MAP. In other words, only the mobile station having an MCS value equal to or greater than the MCS bound can attempt transmission based on the CQI report of the mobile station:

Furthermore, the minimum access class field indicates that PDUs for which the access class of the mobile station is greater than or equal to the minimum access class are allowed to be transmitted through a resource area allocated by the RA A-MAP.

In other words, only the mobile stations having a service having the access class equal to or greater than the minimum access class at present can attempt uplink data burst transmission.

The following Table 2 illustrates an example of the format of UL Random Access A-MAP (UL RA A-MAP) in case using MU-MIMO according to another embodiment of the present disclosure.

TABLE 2

| Syntax | Size in bits | Description/Notes |
|---|---|---|
| UL Random Access A-MAP IE( ){ | — | — |
| A-MAP IE Type | 4 | UL random access A-MAP IE |
| $I_{sizeoffset}$ | 5 | Offset used to compute burst size index |
| Resource Index | 11 | 5 MHz: 0 in first 2 MSB bits + 9 bits for resource index 10 MHz: 11 bits for resource index 20 MHz: 11 bits for resource index Resource index includes location and allocation size |

TABLE 2-continued

| Syntax | Size in bits | Description/Notes |
|---|---|---|
| Long TTI Indicator | 1 | Indicates number of subframes spanned by the allocated resource. 0b0: 1 subframe (default) 0b1: 4 UL subframes for FDD or all UL subframes for TDD If number of DL subframes, D is less than number of UL subframes, U, Long TTI Indicator = 0b1 |
| TNS | 2 | Total Number of streams in the LRU for CSM 0b00: 1 stream only, 0b01: 2 streams, 0b10: 3 streams, 0b11: 4 streams |
| HFA | 6 | HARQ Feedback Allocation |
| Number of Retransmission | 2 | Maximum number of retransmissions if decoding is failed. 0b00: 0, 0b01: 1, 0b10: 2, 0b11: 3 |
| MCS Bound | 4 | The MCS bound for this transmission. AMSs whose latest nominal MCS reported is equal or larger than MCS Bound is allowed to transmit the data burst through this allocation. |
| Minimum Access Class | 2 | PDU whose access class is equal or larger than minimum access class is allowed to be sent in this allocation. |
| Reserved | 5 | |

Referring to Table 2, the RA A-MAP contains a total number of streams (TNS) field.

Here, the TNS field indicates a total number of receivable streams in the mobile station. In other words, the base station informs the total number of receivable streams through TNS, and the mobile station may randomly select any one of available streams to transmit data to the one stream.

AMS Identification Method

As illustrated in the above Table 1, since information on the mobile station does not exist in the UL RA A-MAP transmitted by the base station, when data is transmitted to a resource area allocated by the UL RA A-MAP, the mobile station transmits MAC PDU to the base station by containing a mobile station identifier (ID) therein.

For example, in case of an IEEE 802.16m system, the mobile station transmits the STID to the base station, thereby providing information on the mobile station transmitting uplink data to the base station.

Here, the mobile station can transmit a BR header containing the STID to the base station.

Furthermore, the mobile station can transmit UL MAC PDU by containing an extended header (EH) informing the STID therein.

When the extended header (EH) informing the STID is transmitted, STID EH may be configured as illustrated in the following Table 3.

TABLE 3

| EH Type(4) | STID (MSB) (4) |
|---|---|
| STID (LSB) (8) | |

In case of 3GPP LTE, in order to inform the information of the mobile station to the base station, the mobile station may transmit MAC PDU to the base station by containing a specific mobile station identifier control element (C-RNTI control element) therein.

Hereinafter, a method of transmitting a contention-based uplink data burst according to an embodiment of the present disclosure will be described in detail with reference to the accompanying drawings (a case where there is no HARQ retransmission for an uplink data burst transmitted by the mobile station is taken as an example).

Figure 4:
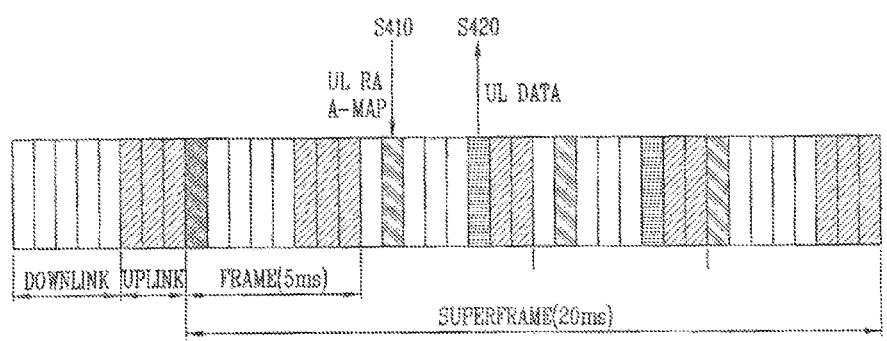
FIG. 4 is a view illustrating a method of transmitting contention-based uplink data according to an embodiment of the present disclosure.

First, FIG. 4 is a view illustrating a method of transmitting contention-based uplink data according to an embodiment of the present disclosure.

Referring to FIG. 4, the base station transmits UL Random Access A-MAP masked with CRC by an STID or multicast STID, which is well known to the mobile station in the downlink sub-frame or fame to the mobile station (S410).

Here, the base station may transmit the UL Random Access A-MAP at a predetermined location of the sub-frame or fame or at any location of the sub-frame or frame. Furthermore, the base station may periodically or non-periodically (or event-driven) transmit the UL Random Access A-MAP to the mobile station.

The mobile station transmits an uplink data burst to the base station through the UL Random Access A-MAP when demasking is successful using the well-known STID or multicast STID (S420).

Figure 5:
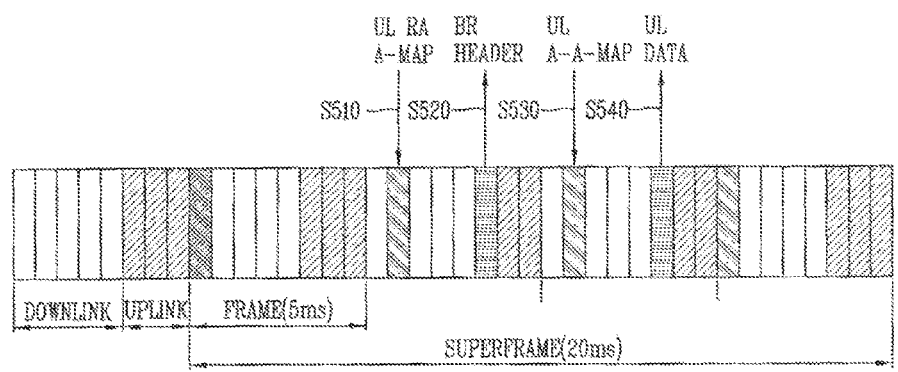
FIG. 5 is a view illustrating a method of transmitting contention-based uplink data through a BR header when a grant size is insufficient according to another embodiment of the present disclosure.

FIG. 5 is a view illustrating a method of transmitting contention-based uplink data through a BR header when a grant size is insufficient according to another embodiment of the present disclosure.

Step S501 is similar to the step S401, and thus the description thereof will be omitted and only different portions will be described.

When a size of the resource allocation area received through the UL RA A-MAP is less than that of a data burst to be transmitted to the base station, the mobile station transmits a BR header to the base station to request a bandwidth (S520). Here, an uplink data burst as much as corresponding to the size of the resource allocation area received through the UL RA A-MAP may be transmitted to the base station.

Here, when the size of the resource allocation area received through the UL RA A-MAP is greater than that of the burst data to be transmitted to the base station, the mobile station may perform a method similar to that of FIG. 4.

Next, the mobile station receives UL Basic Assignment A-MAP (UL A-A-MAP) from the base station (S530), and transmits an uplink data burst through a resource area allocated by the received UL A-A-MAP (S540). Here, the mobile station may also transmit the remaining data burst through a resource area allocated by the UL A-A-MAP.

Figure 6:
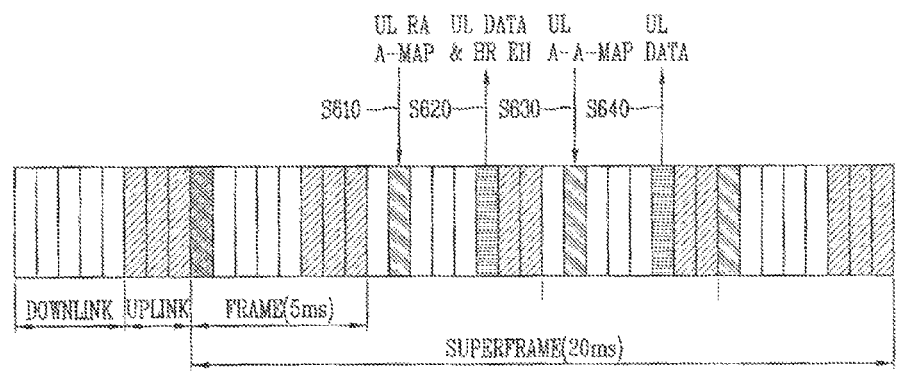
FIG. 6 is a view illustrating a method of transmitting contention-based uplink data through a piggyback of BR EH and part of UL data when a grant size is insufficient according to still another embodiment of the present disclosure.

FIG. 6 is a view illustrating a method of transmitting contention-based uplink data through a piggyback of BR EH and part of UL data when a grant size is insufficient according to still another embodiment of the present disclosure.

Step S601 is similar to the step S401, and thus the description thereof will be omitted and only different portions will be described.

When a size of the resource allocation area received through the UL RA A-MAP is less than that of a data burst to be transmitted to the base station, the mobile station transmits part of uplink data as much as a size of the resource area allocated through the UL RA A-MAP and a piggyback BR extended header to the base station to request a bandwidth for UL data transmission (S620).

Next, the mobile station receives UL Basic Assignment A-MAP (UL A-A-MAP) from the base station (S630), and transmits the remaining data burst through a resource area allocated by the received UL A-A-MAP (S640).

When a plurality of UL RA A-MAPs are transmitted from the base station, the mobile station may determine resources to be used for uplink data burst transmission by using a method that is used in random access.

Second Embodiment

According to a second embodiment, there is provided a method of transmitting a contention-based uplink data burst using Random Access A-MAP in a machine-to-machine (M2M) environment.

First, machine-to-machine communication will be described in brief.

Machine-to-machine (M2M) communication refers to communication between an electronic device and an electronic device as its expression. In other words, M2M communication refers to communication between objects. In general, M2M communication refers to wired or wireless communication between electronic devices or communication between a human-controlled device and a machine, but it may be also used as a meaning of particularly referring to wireless communication between an electronic device and an electronic device, namely, between machines. M2M mobile stations used in a cellular network may have lower performance or capability than that of typical terminals.

Furthermore, the features of the M2M environment are as follows.

1. A large number of terminals within a cell
2. Low amount of data
3. Low transmission frequency
4. Limited number of data characteristics
5. Insensitive to time delay Hereinafter, a method of transmitting a contention-based UL data in the machine-to-machine (M2M) communication will be described in detail.

Group-Wise Scheduling

When the base station performs scheduling for resource allocation in the unit of mobile station, a cost burden for maintenance increases due to a large number of M2M mobile stations. Accordingly, the base station may perform scheduling in the unit of M2M group.

Here, the base station allocates resources in the unit of M2M group while appropriately controlling the number and ratio thereof, thereby applying the contention UL transmission method to an M2M environment.

In other words, the base station may perform scheduling between M2M groups by considering a priority, a kind of services, a size of resource allocation, and the like between M2M groups.

Polling Based Resource Allocation

When random access is allowed for mobile stations in an M2M environment, the performance of the existing mobile stations may be reduced due to a large number of mobile stations.

Because the bandwidth required for a mobile station in the M2M environment is relatively constant, even a complicated bandwidth request (BR) does not have a significant meaning.

Accordingly, the base station may allocate resources using RA A-MAP without allowing a bandwidth request for the M2M mobile station. Here, the base station may transmit information indicating that a bandwidth request is not allowed in advance to the mobile station.

In this case, because only a specific M2M mobile station attempts contention-based uplink data transmission, it does not affect the performance of the existing mobile stations. Accordingly, the mobile station may use a channel quality indicator (CQI) that has been stored in the mobile station without being transmitted to the base station.

Hereinafter, an operation method of the base station for a method of transmitting contention-based uplink data in an M2M environment will be described.

First, the base station allocates a multicast STID that can receive RA A-MAP to a specific M2M group. Here, the base station may consider a number of mobile stations in the M2M group, a size of resource allocation, a kind of service, a priority, and the like to allocate the multicast STID to the specific M2M group.

Next, the base station transmits the RA A-MAP to the mobile station by masking the CRC of the Random Access A-MAP with the multicast STID to allocate resources to the specific M2M group.

The base station may periodically or non-periodically transmit the RA A-MAP to the mobile station at a predefined location or any location of the frame or sub-frame.

Here, when the base station periodically transmits the RA A-MAP to the mobile station, the base station may provide its associated period information during the access process or transmit the period information to the mobile station by containing it in the RA A-MAP or multicast control information.

Method of Controlling the Number of Mobile Stations

The base station transmits an MCS bound (lower, upper) by containing it in the RA A-MAP, thereby controlling the number and characteristics of the mobile stations attempting uplink data burst transmission.

Furthermore, the base station may transmit minimum access class by containing it in the RA A-MAP, thereby controlling the number of mobile stations.

The following Table 4 illustrates an example of the format of RA A-MAP according to a second embodiment of the present disclosure.

TABLE 4

| Syntax | Size in bits | Description/Notes |
| --- | --- | --- |
| UL_Random_Access_A-MAP IE( ){ | — | — |
| A-MAP IE Type | 4 | UL random access A-MAP IE |
| $I_{sizeoffset}$ | 5 | Offset used to compute burst size index |
| Resource Index | 11 | 5 MHz: 0 in first 2 MSB bits + 9 bits for resource index<br>10 MHz: 11 bits for resource index<br>20 MHz: 11 bits for resource index<br>Resource index includes location and allocation size |
| Long TTI Indicator | 1 | Indicates number of subframes spanned by the allocated resource.<br>0b0: 1 subframe (default)<br>0b1: 4 UL subframes for FDD or all UL subframes for TDD<br>If number of DL subframes, D is less than number of UL subframes, U, Long TTI Indicator = 0b1 |
| HFA | 6 | HARQ Feedback Allocation |
| Number of Retransmission | 2 | Maximum number of retransmissions if decoding is failed.<br>0b00: 0, 0b01: 1, 0b10: 2, 0b11: 3 |
| MCS(Lower) | 4 | The MCS bound for this transmission. AMSs whose latest nominal MCS reported is equal or larger than MCS Bound is allowed to transmit the data burst through this al location. |
| MCS(Upper) | 4 | The MCS bound for this transmission. AMSs whose latest nominal MCS reported is equal or lesser than MCS Bound is allowed to transmit the data burst through this allocation. |
| Device ID Modulo(DIM) | 2 | A value used when performing modulo on Device ID (0b00: 1, 0b01: 2, 0b10: 4, 0b11: 8) |
| Acceptance(M) | 2 | Transmission is available for only mobile stations with M as a result of performing modulo on Device ID with DIM |
| } | — | — |

Figure 7:
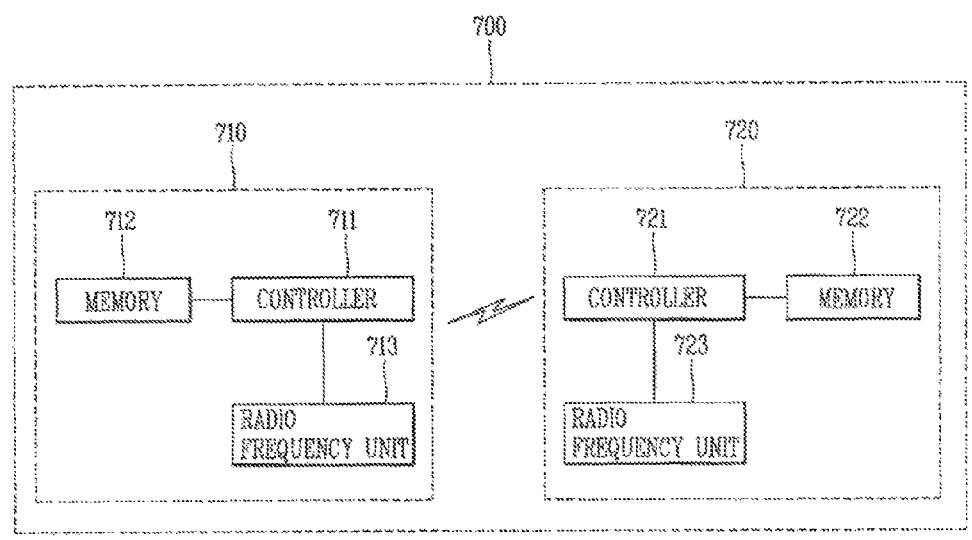
FIG. 7 is a block diagram illustrating a wireless communication system according to an embodiment of the present disclosure.

FIG. 7 is a block diagram illustrating a wireless communication system according to an embodiment of the present disclosure.

The base station 710 may include a controller 711, a memory 712, and a radio frequency (RF) unit 713.

The controller 711 implements the proposed function, process and/or method. The layers of a wireless interface protocol may be implemented by the controller 711.

The controller 711 can control to transmit an uplink data burst through a resource allocation area received through the RA A-MAP.

The memory 712 is connected to the controller 711 to store a protocol or parameter for multiple carrier management. The RF unit 713 is connected to the controller 711 to transmit and/or receive a wireless signal.

The mobile station 720 may include a controller 721, a memory 722, and a radio frequency (RF) unit 723.

The controller 721 implements the proposed function, process and/or method. The layers of a wireless interface protocol may be implemented by the controller 721. The controller 721 can control to transmit an uplink data burst through a resource allocation area received through the RA A-MAP.

The memory 722 is connected to the controller 721 to store a protocol or parameter for multiple carrier management. The RF unit 723 is connected to the controller 711 to transmit and/or receive a wireless signal.

The controller 711, 721 may include an application-specific integrated circuit (ASIC), another chip set, a logic circuit and/or a data processing device. The memory 712, 722 may include a read-only memory (ROM), a random access memory (RAM), a flash memory, a memory card, a storage medium/and or another storage device. The RF unit 713, 723 may include a baseband circuit for processing a wireless signal. When the embodiment is implemented by software, the foregoing technique may be implemented by a module (process, function, etc.) performing the foregoing function. The module may be stored in the memory 712, 722, and implemented by the controller 711, 721. The memory 712, 722 may be located in or out of the controller 711, 721, and connected to the controller 711, 721 through various well-known means.

The invention claimed is:

1. A method of transmitting an uplink data burst of a mobile station in a wireless access system, the method comprising:
receiving, from a base station, a first message containing resource allocation information for a contention-based uplink data burst transmission and modulation and coding scheme (MCS) bound information having a threshold value for determining a contention-based uplink data burst; and
transmitting an uplink data burst to the base station through a resource area allocated from the resource allocation information when a latest channel quality indicator (CQI) feedback value reported by the mobile station has a value greater than or equal to the threshold value of the MCS bound information.

2. The method of claim 1, wherein the first message is a random access advanced map (Random Access A-MAP) message.

3. The method of claim 1, wherein the first message is Cyclic Redundancy Check (CRC)-masked with a broadcast Station Identifier (STID) or multicast STID to be transmitted.

4. The method of claim 1, wherein the resource allocation information comprises any one of a resource allocation location, a resource allocation area size and Modulation and Coding Scheme (MCS) information, and the first message comprises one of a maximum retransmission number information and Hybrid Automatic Repeat Request Acknowledgement (HARQ ACK) channel information.

5. The method of claim 4, further comprising:
comparing the resource allocation area size with a size of the uplink data burst to be transmitted to the base station; and
transmitting a bandwidth request message to the base station when the size of the uplink data burst to be transmitted is greater than the resource allocation area size as a result of the comparison.

6. The method of claim 5, further comprising:
receiving an uplink basic assignment map message from the base station; and
transmitting a remaining uplink data burst to the base station through a resource area allocated by the uplink basic assignment map message.

7. The method of claim 5, wherein the bandwidth request message is a bandwidth request extension header, and the bandwidth request extension header is piggybacked with an uplink data burst to be transmitted.

8. The method of claim 1, wherein the uplink data burst is transmitted as a Medium Access Control Protocol Data Unit (MAC PDU), and the MAC PDU comprises a mobile station identifier for identifying a mobile station.

9. The method of claim 1, further comprising:
receiving an indicator indicating whether the first message is transmitted from the base station; and
determining whether to monitor the first message using the received indicator.

10. The method of claim 1, wherein the first message further comprises total number of streams (TNS) information indicating a total number of streams to be used in the uplink data burst transmission.

11. The method of claim 10, wherein any one of the total number of streams is selected to transmit an uplink data burst to the base station through the selected stream.

12. A mobile station for transmitting an uplink data burst in a wireless access system, the mobile station comprising:
a memory;
a radio frequency unit configured to transmit and receive a wireless signal to and from an external device; and
a controller configured to
control the radio frequency unit to receive a first message from a base station, the first message containing resource allocation information for a contention-based uplink data burst transmission and modulation and coding scheme (MCS) bound information having a threshold value for determining contention-based uplink data burst, and
control the radio frequency unit to transmit an uplink data burst to the base station through a resource area allocated from the resource allocation information when a latest channel quality indicator (CQI) feedback value reported by the mobile station has a value greater than or equal to the threshold value of the MCS bound information.

13. The mobile station of claim 12, wherein the first message is a random access advanced map (Random Access A-MAP) message.

14. The mobile station of claim 12, wherein the controller controls the radio frequency unit to
compare the resource allocation area size with a size of the uplink data burst to be transmitted to the base station, and
transmit a bandwidth request message to the base station when the size of the uplink data burst to be transmitted is greater than the resource allocation area size as a result of the comparison.

15. The mobile station of claim 14, wherein the controller controls the radio frequency unit to receive an uplink basic assignment map message from the base station, and controls the radio frequency unit to transmit a remaining uplink data burst to the base station through a resource area allocated by the uplink basic assignment map message.

16. The mobile station of claim 15, wherein the bandwidth request message is a bandwidth request extension header, and the controller controls the radio frequency unit such that the bandwidth request extension header is piggybacked with an uplink data burst to be transmitted.

* * * * *